Nov. 20, 1951     R. H. WHEELER     2,575,901

THROTTLE CONTROL

Filed Dec. 30, 1947

INVENTOR.
RICHARD H. WHEELER,
BY
H. O. Clayton
ATTORNEY

Patented Nov. 20, 1951

2,575,901

UNITED STATES PATENT OFFICE 2,575,901

THROTTLE CONTROL

Richard H. Wheeler, Utica, Mich., assignor to Bendix Aviation Corporation, South Bend, Ind., a corporation of Delaware Application December 30, 1947, Serial No. 794,477

3 Claims. (Cl. 192—.096)

This invention relates in general to control mechanism adapted to be incorporated in the power plant of an automotive vehicle and more particularly to a stop mechanism for controlling the operation of a manually or power operated control member.

In the operation of an automotive vehicle it is of course desirable to refrain from racing the engine when the same is disconnected from the change speed transmission and other driven parts of the power plant. In other words, with a normal operation of the vehicle it is best not to depress the accelerator at the time the friction clutch is disengaged. Accordingly my invention is directed to a stop mechanism for insuring a closure of the throttle of the vehicle as the clutch is being operated. It is to be noted however that the mechanism of my invention may also be employed to prevent the operation of a certain control member when another control member is being operated; accordingly, my invention may be used in other types of control mechanism.

A further object of my invention is to provide stop means operated by the friction clutch of an automotive vehicle and operative, when the plates of the clutch are separated more than a slight degree, to prevent a throttle opening movement of the linkage interconnecting the accelerator and throttle of the vehicle.

Yet another object of my invention is to provide a simple, compact and easily serviced mechanical means for preventing a racing of the engine of an automotive vehicle when driven parts of the power plant of the vehicle are disconnected from the engine; for example, when the friction clutch of the power plant is disengaged preliminary to effecting an operation of the change speed transmission.

The above and other objects and features of the invention will appear more fully hereinafter from a consideration of the following description taken in connection with the accompanying drawings wherein a single embodiment of the invention is illustrated by way of example.

Figure 1:
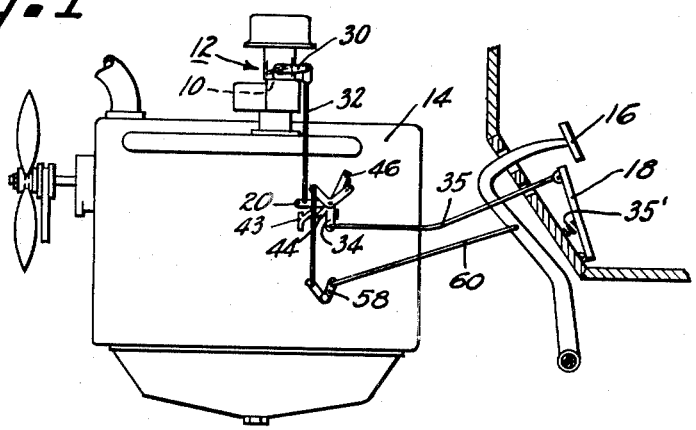
Figure 1 is a diagrammatic view disclosing the control mechanism of my invention incorporated in the power plant of an automotive vehicle, said mechanism being employed to maintain the throttle of the engine of the power plant closed when the clutch is being operated.

Referring now to Figure 1 disclosing the stop mechanism of my invention incorporated in the power plant of an automotive vehicle said mechanism is employed to prevent an opening of the throttle valve 10 when the clutch, not shown, is disengaged. The throttle valve constitutes a part of the carburetor 12 of the internal combustion engine 14 of the vehicle; and the clutch, which is preferably of the friction type, may be actuated by a manually operated clutch pedal 16.

In the mechanism of my invention, the throttle valve 10 is preferably actuated by a manually operated accelerator pedal 18 the connection between said pedal and valve including a lever 20 fulcrumed on a mounting shaft 22 conveniently supported on some portion of the chassis of the vehicle or mounted on the casing of the internal combustion engine 14. The lever 20, preferably bell crank in design, includes an arm 24 and an arm 26 the latter being bent outwardly, Figure 2, and then laterally, Figure 4, to provide a stop member 28. The lever 20 is preferably connected to the throttle valve 10 by a crank 30 and a link 32; and said lever is yieldingly connected to a crank 34 by a torsion spring 36, Figure 4, one end portion 38 of said spring contacting the lever arm 26 and another end portion 40 of said spring contacting the crank 34. The latter member may be connected to the accelerator by a link 35 and the accelerator is moved to its throttle closed position by a spring 35'. The torsion spring 36 biases the stop 28 of the lever 20 into contact with the crank 34 thereby making of the lever and crank a single throttle operating angularly movable lever unit 20, 34. When the stop mechanism of my invention is inoperative a depression of the accelerator 18 serves to rotate the lever unit 20, 34 in a clockwise direction, Figure 2, thereby rotating the crank 30 to open the throttle.

It is, of course, the usual practice, in the operation of the controls of the power plant of an automotive vehicle, to keep the throttle closed when the clutch is being operated incidental to an operation of the change speed transmission; and my invention provides a mechanism for insuring said closure of the throttle during this operation of the clutch and transmission.

To this end there is provided a stop mechanism preferably operative, when the driving and driven plates of the friction clutch are separated more than a slight degree, to prevent a movement of the linkage interconnecting the accelerator and throttle. With this mechanism the throttle may be opened just before the clutch is engaged however, the mechanism of my invention may also be adjusted so that the throttle may be opened substantially simultaneously with the completion of the engagement of the clutch.

Describing the details of the stop mechanism there is provided a two armed stop member pivotally mounted on the shaft 22 the lower arm 44 of said member being adapted to abut the stop member 28. To the upper end of the upper arm 46 of the stop member 44, 46 there is secured a tab 48, and to this tab there is secured a tension spring 50. The lower end of the spring 50 is secured to the end of arm 52 of a bell crank lever pivotally mounted on the shaft 22. To the lower arm 54 of the latter lever there is pivotally connected a link 56 said link being bent laterally at its upper end as disclosed in Figure 4. The link 56 constitutes a part of the force transmitting linkage interconnecting the lever 52, 54 with the friction clutch of the car the remainder of said linkage being indicated by the reference numerals 58 and 60.

Figures 2, 3:
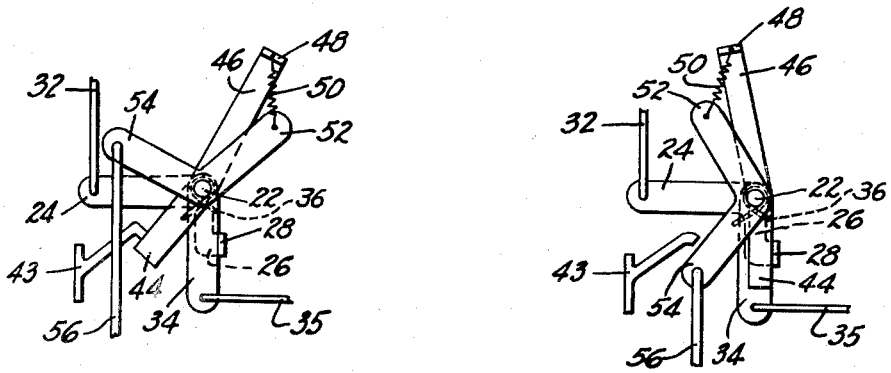
Figure 2 is a view disclosing the position of the parts of the control mechanism of Figure 1 when the throttle is closed and the clutch is engaged.
Figure 3 is a view disclosing the position of the parts of the control mechanism of Figure 1 when the throttle is closed and the clutch is disengaged.

Describing now the operation of the stop mechanism of my invention when the clutch is engaged and the accelerator is released to close the throttle, the parts of the mechanism of my invention assume the positions disclosed in Figure 2. The spring 50 is then operative to exert a force rotating the stop member 44, 46 in a clockwise direction thereby moving its arm 44 away from the stop 28 of the lever unit 20, 34 and into contact with a stop 43.

It will be assumed that the driver of the vehicle will then disengage the clutch preparatory to effecting an operation of the transmission. With the embodiment of my invention disclosed in Figure 1 of the drawings the clutch is disengaged by an operation of the clutch pedal 16, however the throttle controlling stop mechanism of my invention may be incorporated in a power mechanism for operating the clutch and transmission such for example as the mechanism disclosed in the Earl R. Price U. S. application for patent No. 642,240, filed January 19, 1946. With the mechanism of this application the clutch is automatically disengaged by power means when the speed of the car is reduced to a certain factor and the accelerator is released.

Describing the operation of the mechanism of my invention, as the clutch is being disengaged, the parts of said mechanism move from the positions disclosed in Figure 2 to the positions disclosed in Figure 3. In this operation downward movement of the link 56 serves to rotate lever 52, 54 in a counterclockwise direction thereby moving the spring 50 past its dead center position with respect to its connection with the tab 48 and the fulcrum of the lever 52, 54. In other words when the longitudinal axis of the spring 50 is to the left of the aforementioned fulcrum then there is developed a component of force tending to rotate the stop member 44, 46 in a counterclockwise direction to the position disclosed in Figure 3; in this position the arm 44 contacts the stop 28 as disclosed in said figure. It is also to be noted that the spring 50 is preferably stronger than the torsion spring 36 the relative strengths of said springs facilitating the operation of the mechanism.

Figure 4:
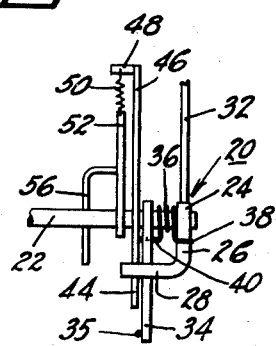
Figure 4 is an end view of the mechanism disclosed in Figures 2 and 3.

Now with the parts of the mechanism of my invention established in the positions disclosed in Figure 3 it is impossible to open the throttle inasmuch as a depression of the accelerator will merely effect a tighter winding of the torsion spring 36; and this operation of the mechanism will be apparent from an inspection of Figure 4 of the drawings. In other words with the mechanism of my invention there can be no opening of the throttle when the clutch is disengaged.

The clutch being disengaged, the driver will probably operate the transmission, not shown, to change its gear setting. The clutch will then be re-engaged, the lever 52, 54 rotating in a clockwise direction back to the position disclosed in Figure 2. In this operation the stop member 44, 46 remains in its operative position holding the throttle closed until the spring 50 passes its dead center position. The spring 50 then exerts a component of force tending to rotate the stop 44, 46 in a clockwise direction thereby moving the same away from the stop 28 and permitting the throttle to be opened. The parts of the mechanism are preferably so constructed and arranged that the clutch plates are still separated very slightly when the spring 50 reaches its dead center position and with such a mechanism the throttle is opened shortly before the clutch is completely engaged, that is before the clutch plates are in full driving engagement with each other. The parts of the mechanism of my invention may however be constructed, arranged, and adjusted so that the throttle is opened simultaneously with or substantially simultaneously with the completion of the engagement of the clutch.

There is thus provided a simple, compact and effective stop mechanism for insuring a closure of the throttle of an automotive vehicle when the clutch of the vehicle is disengaged; and such a mechanism prevents an undesired racing of the engine with the attendant wear of the parts thereof.

Although only one embodiment of the invention has been illustrated and described, various changes in the form and relative arrangements of the parts may be made to suit requirements.

I claim:

1. A control mechanism adapted to be incorporated in the power plant of an automotive vehicle including a mounting shaft, an angularly movable lever unit rotatably mounted on said shaft, said unit including two relatively movable members, and stop means for preventing the actuation of one of the two members of said lever unit including a stop member rotatably mounted on said shaft and adapted to abut a portion of the last mentioned member of the lever unit, and means for operating the stop member including a lever member rotatably mounted on the shaft and yieldable means interconnecting the lever member and stop member.

2. A control mechanism adapted to be incorporated in the power plant of an automotive vehicle including a mounting shaft, an angularly movable lever unit rotatably mounted on said shaft said unit including a two armed lever member adapted to be connected to a member to be actuated, a crank rotatably mounted on the shaft, and a torsion spring yieldably interconnecting the crank and lever member; together with stop means for preventing the actuation of the lever member including a stop member rotatably mounted on the shaft and adapted to abut a portion of the lever member, and means for operating the stop member to move the same into or out of its operative position including a lever member and a spring interconnecting the latter member and stop member.

3. In an automotive vehicle provided with a throttle, an accelerator, and a friction clutch; means interconnecting the throttle, accelerator and clutch including stop mechanism adapted to prevent an operation of the throttle when the clutch is disengaged, said interconnecting means including a mounting shaft, a lever unit rotatably mounted on the shaft, stop means for preventing the opening of the throttle when the clutch is disengaged including a stop member, a lever member, and a spring interconnecting the latter member and stop member, together with force transmitting linkage interconnecting the latter lever member and clutch, and force transmitting means interconnecting the lever unit and accelerator.

RICHARD H. WHEELER.

REFERENCES CITED

The following references are of record in the file of this patent:

UNITED STATES PATENTS

| Number | Name | Date |
| --- | --- | --- |
| 2,092,447 | Fleischel | Sept. 7, 1937 |
| 2,203,057 | Moore | June 4, 1940 |
| 2,267,996 | Spose | Dec. 30, 1941 |
| 2,358,597 | Russell | Sept. 19, 1944 |
| 2,372,842 | Mossinghoff | Apr. 3, 1945 |
| 2,402,851 | Soble | June 25, 1946 |